US012497279B2

(12) United States Patent
Levin

(10) Patent No.: US 12,497,279 B2
(45) Date of Patent: Dec. 16, 2025

(54) HAND HELD DEVICE FOR AUTOMATICALLY REMOVING AND REPLACING SCREW-ON CAPS FOR CRYOGENIC TUBES, CRYOGENIC VIALS AND MICROTUBES

(71) Applicant: Merck Sharp & Dohme LLC, Rahway, NJ (US)

(72) Inventor: Robert A. Levin, Coatesville, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 282 days.

(21) Appl. No.: 17/819,803

(22) Filed: Aug. 15, 2022

(65) Prior Publication Data

US 2023/0055698 A1 Feb. 23, 2023

Related U.S. Application Data

(60) Provisional application No. 63/234,306, filed on Aug. 18, 2021.

(51) Int. Cl.
*B67B 7/18* (2006.01)
*B01L 3/00* (2006.01)

(52) U.S. Cl.
CPC .......... *B67B 7/182* (2013.01); *B01L 3/50825* (2013.01)

(58) Field of Classification Search
CPC ........... B67B 3/14; B67B 3/20; B67B 3/2046; B67B 3/2006; B67B 3/202; B67B 7/06; B67B 7/16; B67B 7/164; B67B 7/18; B67B 7/182; B67B 7/44; B67B 3/50825; B01L 2300/042; B01L 99/00
See application file for complete search history.

(56) References Cited

U.S. PATENT DOCUMENTS 4,926,717 A * 5/1990 Gomes .................... B67B 7/182 81/3.2
6,477,919 B1 * 11/2002 Thomas .................... B67B 3/02 81/3.2
7,818,864 B2 * 10/2010 Wilkinson ................ B25F 5/02 29/469
2002/0171631 A1 * 11/2002 Yanagi .................. G06F 3/0312 345/163
2010/0263492 A1 * 10/2010 Mah ........................ B67B 7/182 81/3.2
2012/0186400 A1 * 7/2012 Elger .................... B25B 13/465 81/54

(Continued)

OTHER PUBLICATIONS

Thermofisher Scientific, 8-Channel Screw Cap Decapper, ThermoFisher Scientific, N/A, 106, Catalog No. 4105MAT.

(Continued)

*Primary Examiner* — Robert J Scruggs
(74) *Attorney, Agent, or Firm* — Eric Greenwald; John C. Todaro

(57) ABSTRACT

A handheld, battery operated device that, when activated, will grip a screw-cap on the top of a cryogenic vial, microtube, test tube or other pharmaceutical product container, and automatically rotate the cap in a counterclockwise direction to remove the cap, and automatically rotate the cap in a clockwise direction to fasten the cap back on the cryogenic vial, microtube, test tube or other pharmaceutical product container.

5 Claims, 4 Drawing Sheets

(56) References Cited

U.S. PATENT DOCUMENTS

| | | | | |
|---|---|---|---|---|
| 2016/0375563 | A1* | 12/2016 | Junkers | B25F 5/026<br>81/467 |
| 2022/0266437 | A1* | 8/2022 | Silorio | A01B 1/227 |

OTHER PUBLICATIONS

Thermofisher Scientific, Capit-All Screw Cap Tube Capper/Decapper, ThermoFisher Scientific, N/A, 1-8, Catalog No. 4111MAT.

* cited by examiner

HAND HELD DEVICE FOR AUTOMATICALLY REMOVING AND REPLACING SCREW-ON CAPS FOR CRYOGENIC TUBES, CRYOGENIC VIALS AND MICROTUBES

CROSS-REFERENCE TO RELATED APPLICATIONS

This application claims benefit of U.S. Provisional Application Ser. No. 63/234,306, filed on Aug. 18, 2021, the contents of which is hereby incorporated by reference in its entirety.

BACKGROUND OF THE INVENTION

The present invention relates generally to devices and methods for opening and closing cryogenic tubes, cryogenic vials, microtubes, test tubes and other pharmaceutical product containers having screw-on caps. More particularly, the present invention relates to electronic devices operable to automatically remove or replace screw-on caps for cryogenic tubes, cryogenic vials, microtubes, test tubes or other pharmaceutical product containers.

RELATED ART

Pharmaceutical products, such as drugs and vaccines, are often stored, processed, shipped and/or distributed in relatively small, plastic or glass cryogenic tubes, cryogenic vials, microtubes, test tubes and other pharmaceutical product containers having screw-on caps. Pharmaceutical researchers and developers frequently have to open or close large quantities of such containers in a short period of time. Typically, cryogenic vials and cryogenic tubes are delivered in sterile packages of 500 or more units, all with the caps already affixed to them. Therefore, from time to time, researchers, developers, lab assistants and other lab workers have to manually unscrew and remove the caps from hundreds, if not thousands, of cryogenic vials or cryogenic tubes to begin or complete a particular laboratory research assignment or production project.

Unscrewing and removing a cap from a cryogenic vial or cryogenic tube, or replacing a cap on a cryogenic vial or cryogenic tube can sometimes require multiple full rotations of the wrist, depending on the design of the vial or tube, or depending on the manufacturer. Therefore, the work required to open or close a large number of these containers can be both very tedious and highly repetitive. More importantly, however, unscrewing (or screwing on) hundreds or thousands of caps over time can cause considerable wrist and arm fatigue, as well as significant numbness and pain. Repetitively performing these motions over time can also expose researchers, developers, lab assistants and other lab workers to increased risk of developing serious long-term or permanent medical conditions, such as Carpal Tunnel Syndrome (CTS).

Accordingly, there is a considerable need in the pharmaceutical industry for a device capable of automatically unscrewing and removing the caps from cryogenic vials, microtubes, test tubes and other small pharmaceutical product containers, and/or automatically screwing the caps back on the containers, so that the operators of the device do not have to perform the tedious and potentially harmful tasks of removing or replacing the caps manually.

SUMMARY OF THE INVENTION

Aspects and embodiments of the present invention address the above-described need by providing a handheld, battery operated device that, when activated, will grip a screw-cap on the top of a cryogenic vial, microtube, test tube or other pharmaceutical product container, and automatically rotate the cap in a counterclockwise direction to remove the cap from the cryogenic vial, microtube, test tube or other pharmaceutical product container tube, and automatically rotate the cap in a clockwise direction to fasten the cap back on the cryogenic vial, microtube, test tube or other pharmaceutical product container.

In general, devices constructed and configured to operate according to embodiments of the present invention comprise a battery compartment, a battery, an electric drive motor, a gear assembly, a housing, a septum, one or more activation switches, and suitable wiring to electrically couple the battery, the electric drive motor, and the one or more switches. The housing surrounds and protects the drive motor and gear assembly. The housing also provides a suitably ergonomic handle for the device. The septum is attached to a rod extending from the housing. The opposite end of the rod is attached to a gear assembly inside the housing. The gear assembly comprises two or more gears, including a first toothed gear fixedly attached to a spindle extending from the drive motor, and a second toothed gear fixedly attached to the proximal end of the rod, opposite from the end where the septum is attached. The two or more gears are intermeshed so that rotation of the spindle by the drive motor rotates the first gear, which in turn rotates the other gears in the gear assembly, including the second gear, which rotates the rod, which in turn rotates the septum. Thus, the operation of the drive motor ultimately causes the septum to rotate. When the rotating septum is placed over the top of a screw cap of a cryogenic tube or cryogenic vial, the screw cap can be unscrewed from the cryogenic tube or vial, or, if the device is operated to rotate the spindle and septum in the opposite direction, it will screw on the screwcap.

In embodiments comprising two or more switches, one of the switches preferably comprises a double-position, double-throw (DPDT) control switch, which permits the operator to select one of three options, including (a) a first position to select continuous rotation of the drive motor and septum in the clockwise direction to screw a cap onto a container, or (b) a second position to select continuous rotation of the drive motor and septum in the counterclockwise direction to unscrew a cap, or (c) a third position to turn the drive motor, and the device off. In this embodiment, the other switch may comprise, for example, a momentary single-position, single-throw (SPST) control switch, which enables pulsatile operation of the device in either direction, depending on the current position of the DPDT control switch.

In some embodiments of the present invention, the second switch may comprise, for example, a locking SPST control switch, which enables the device to operate in a continuous de-capping mode or a continuous re-capping mode, wherein, once the SPST control switch is thrown a first time, the motor will continue running and continue spinning the septum until the SPST control switch is thrown a second time. Operating the device in continuous de-capping or continuous re-capping mode significantly reduces the amount of time required for one person to uncap or re-cap a large number of cryogenic vials, microtubes, test tubes or other pharmaceutical product containers.

It will be recognized and appreciated by those skilled in the art that several variations on the exemplary devices described herein are possible without departing from the scope of the present invention. One such variation comprises altering the location of the on/off switch. Another such variation comprises providing two or more on/off switches (or two or more momentary or locking STSP switches) in different locations on the same device, which may improve the usability of the device because it enables easily using different hand positions and/or different device orientations during operation. In yet another variation of the device, two batteries and two operating circuits may be provided to enable employing dual momentary plunger switches. With dual momentary plunger switches, one of the momentary switches may be configured to keep the septum rotating in the counterclockwise direction so long as the switch is depressed, while the other momentary switch may be configured to keep the septum rotating in the clockwise direction so long as the switch is depressed. Although the double-battery set-up variation of the device is likely to be heavier than some of the other variations, it eliminates the need for a DPDT control switch to select the direction of spin for the septum.

In some embodiments, the septum is constructed from rubber, or a rubber-like flexible material, and is configured to fold over on itself, which permits the septum to grip and hold onto the caps after removal from the tubes or before being installed on a tube. This increases the flexibility of the device in that it allows the device to be loaded with a cap before using the device to screw the cap onto a container, and also allows the device to retain a cap after removal from a container. In other embodiments, the septum does not grip or hold the cap after removal, and instead permits gravity to cause the caps to just drop off after removal from the container.

Thus, embodiments of the present invention provide a handheld device for removing or replacing a screw-on cap on a cryogenic tube or cryogenic vial. The handheld device comprises a drive motor, a control switch electrically connected to the drive motor, a rod having a proximal end and a distal end, a gear assembly mechanically linking the proximal end of the rod to the drive motor, and a housing unit configured to be grasped by a human hand during operation of the handheld device. The housing unit is also configured to house the drive motor, the gear assembly, the proximal end of the rod and the control switch. The housing unit has a hole through which the distal end of the rod extends. The handheld device also includes a septum attached to the distal end of the rod that is extended through the hole in the housing unit, the septum being configured to form a friction-grip on the screw-cap of the cryogenic tube or cryogenic vial when the septum is pushed onto the screw-cap or the screw-cap is pushed into the septum.

There is also a battery compartment, connected to the housing unit with a connector, the battery compartment comprising an inner cavity adapted to hold a battery and a pair of electrical contacts, the pair of electrical contacts being configured to make contact with the battery and to establish an electrical connection between the battery, the control switch and the drive motor. Activation of the control switch energizes the electrical connection between the battery, the control switch and the drive motor. Energizing the electrical connection causes the drive motor and the gear assembly to start rotating the rod and the septum, and the rotation of the rod and the septum tightens or loosens the screw-cap on the cryotube or cryovial.

In some embodiments, the control switch comprises is a double-position, three-position, double-throw (DPDT) control switch capable of being set in one of three positions, the three positions including:

(a) an “open” position to select continuous rotation of the rod and septum in one direction to unscrew and remove a cap from the cryogenic tube or vial, (b) a “close” position to select continuous rotation of the rod and septum in the opposite direction to screw the screw-cap onto the cryotube or cryovial, and (c) an “off” position to disconnect the electrical connection between the battery and the drive motor.

In other embodiments, the control switch may instead comprise a momentary single-position, single-throw (SPST) plunger control switch that can be pressed to energize the electrical connection between the battery, the control switch and the drive motor to cause the motor to rotate the rod and the septum so long as the control switch is depressed, and prevent the electrical connection from being energized while the control switch is not depressed.

In still other embodiments, the handheld device may have two control switches, comprising a first control switch operable to determine a direction of rotation for the rod and the septum, and a second control switch operable to energize the electrical connection between the battery, the control switch and the drive motor while the second control switch is depressed. The second control switch, and the electrical connections thereto, may be configured to prevent the electrical connection from being energized while the second control switch is not depressed.

BRIEF DESCRIPTION OF THE DRAWINGS

The present invention and various aspects, features and advantages thereof are explained in detail below with reference to exemplary and therefore non-limiting embodiments, and with the aid of the drawings, which constitute a part of this specification and include depictions of the exemplary embodiments. In these drawings.

DETAILED DESCRIPTION OF EXEMPLARY EMBODIMENTS

Exemplary vial holders according to embodiments of the present invention will now be described in more detail with reference to the figures. The handheld de-capping and re-capping device of the present invention is generally designated as 10 in all of the accompanying figures.

Figure 1:
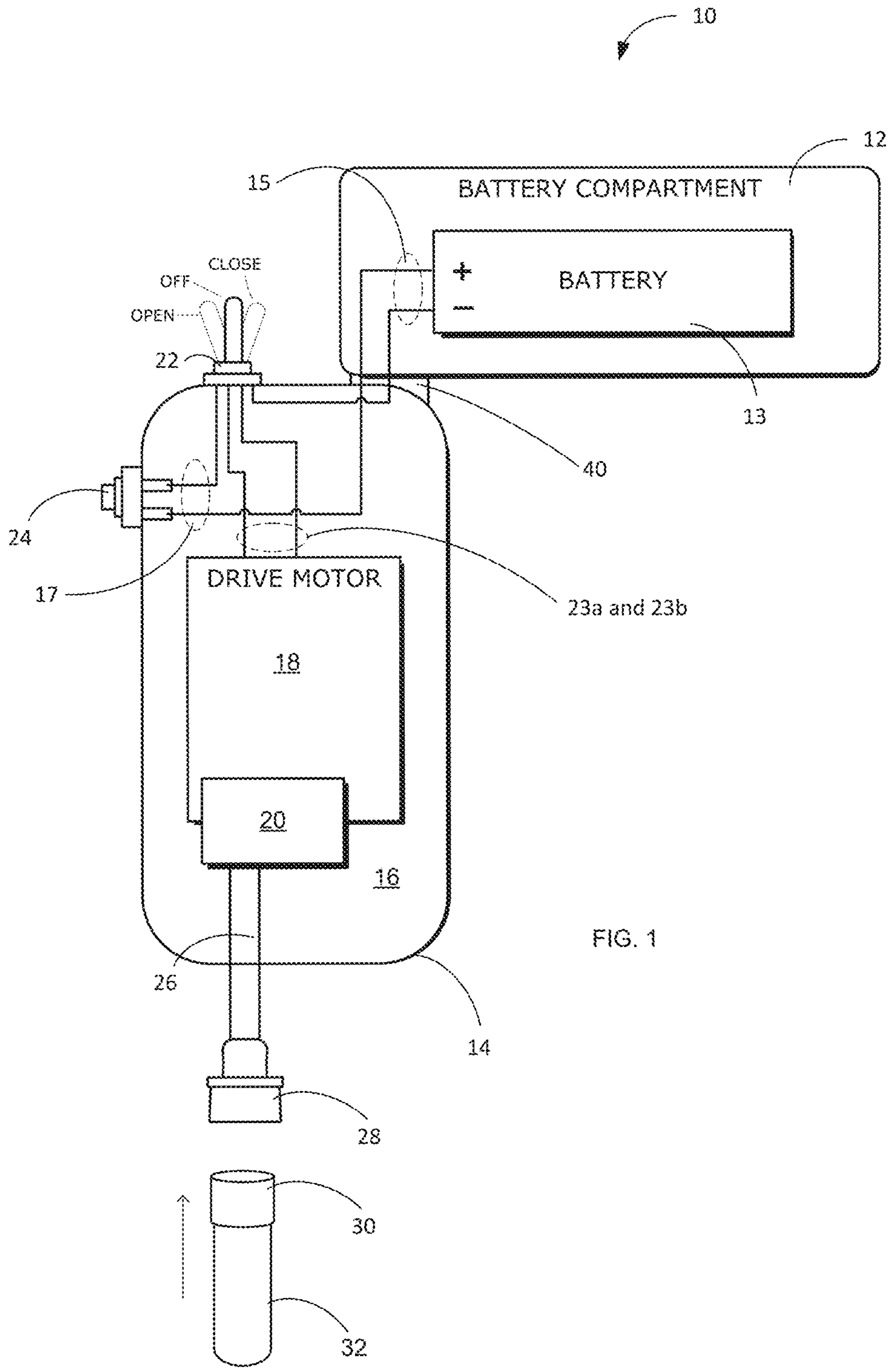
FIG. 1 shows a schematic diagram of a handheld device for automatically removing or replacing screw-caps on cryogenic tubes, cryogenic vials and microtubes according to exemplary embodiments of the present invention.

FIG. 1 shows a schematic diagram of a handheld device 10 for automatically removing or replacing screw-caps on cryogenic tubes, cryogenic vials and microtubes according to exemplary embodiments of the present invention. As shown in FIG. 1, the primary components of the handheld device 10 are a battery compartment 12 and a housing unit 14. The battery compartment 12 comprises an inner cavity of sufficient size and shape to hold a battery 13, such as a 9V battery, as well as electrical contacts (not shown in FIG. 1) to establish electrical connections between the positive and negative terminals of the battery 13 to positive and negative electrical leads (wires) 15 running from the battery compartment 12 and into the housing unit 14. The battery 13 provides operating power for the drive motor 18 (discussed below) and control switches housed inside the housing unit 14 via the positive and negative electrical leads 15.

The housing unit 14 comprises an inner chamber 16 of sufficient size and shape to encapsulate and hold the drive motor 18, a gear assembly 20 and the proximal end of a rod 26. In the embodiment shown in FIG. 1, the housing unit 14 also comprises two control switches. The first control switch attached to the housing unit 14 is a double-position, three-position, double-throw (DPDT) control switch 22 capable of being set in one of three different positions, including (a) an "open" position to select continuous rotation of gears in the gear assembly 20 in one direction to unscrew and remove a cap from a cryogenic tube or vial, or (b) a "close" position to select continuous rotation of the gears in the gear assembly 20 in the opposite direction to screw on a cap, or (c) an "off" position to disconnect from the drive motor 18 the electrical power delivered by the positive and negative leads 15 connected to the battery 13 located in the battery compartment 12, and thus turn the handheld device 10 off. The other control switch attached to the housing unit 14 is a momentary single-position, single-throw (SPST) plunger control switch 24, which enables pulsatile operation of the handheld device 10 in either direction, depending on the current position of the DPDT control switch 22.

Figure 2:
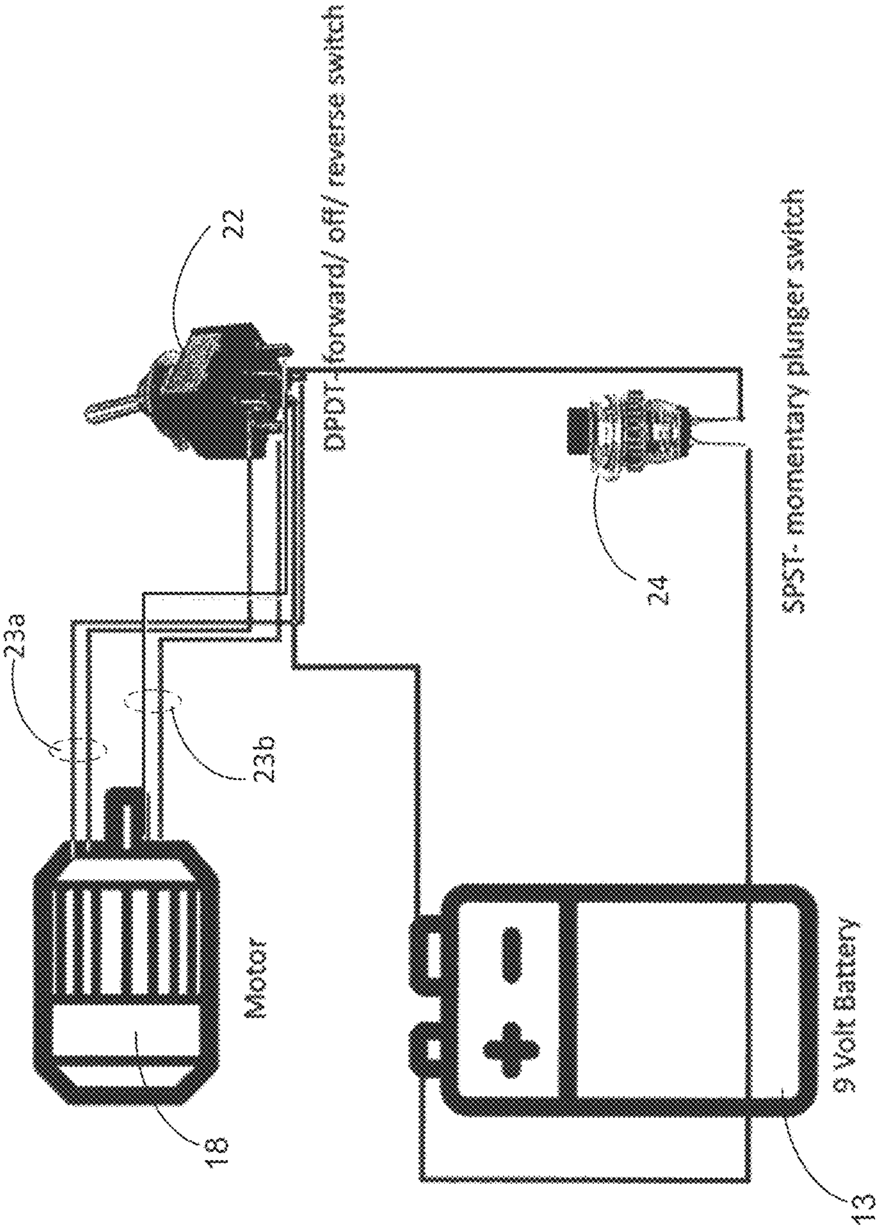
FIG. 2 contains a wiring diagram illustrating, by way of example, an arrangement of electrical leads and electrical connections according to embodiments of the present invention.

The drive motor 18 is electrically connected to the DPDT control switch 22 via two sets of electrical leads 23*a* and 23*b*. The two sets of leads 23*a* and 23*b* enable both directions of rotation for the drive motor spindle and the rod 26. The SPST plunger control switch 24 is electrically connected to the DPDT control switch 22, and the battery 13, by yet another pair of electrical leads 17. All of the electrical connections between the battery 13, the drive motor 18, the control switches 22 and 24, and the electrical leads 15, 17, 23*a* and 23*b* are arranged to provide the electrical power required to activate the drive motor 18 to rotate the spindle (not shown in FIG. 1) in the desired direction depending on the current positions of the DPDT control switch 22 and the momentary SPST plunger control switch 24. FIG. 2 contains a wiring diagram illustrating, by way of example, an arrangement of the electrical leads and electrical connections between the drive motor 18, the DPDT control switch 22, the SPST momentary plunger switch 24 and the battery 13 in the handheld device 10. Those skilled in the art will recognize and appreciate that the number and arrangement of electrical leads and electrical connections may be modified, as appropriate, to support, for example, more batteries, or a greater or lesser number of control switches and motors, without departing from the scope of the claimed invention. Additional control switches may be incorporated into handheld device 10, for example, to enable selecting two or more different speeds for the rotation of the rod 26 and septum 28.

Returning now to FIG. 1, the spindle in the drive motor 18 is mechanically connected to one of the gears (not shown) in the gear assembly 20, which is mechanically connected to the proximal end of the rod 26. The distal end of the rod 26 passes through a hole in the bottom wall of the housing unit 14. A septum 28, configured to grip the cap 20 of a cryogenic tube 32 is attached to the distal end of the rod 26 extended through the hole in the housing unit 14.

Accordingly, when the septum 28 of the handheld device 10 is placed over the cap 30 of the cryogenic tube 32, the DPDT control switch 22 is in the "open" position, and the momentary SPST plunger control switch 24 is depressed, electrical power is supplied to the drive motor 18 from the battery 13 and the electrical leads 15, 17, 23*a* and 23*b*. The resulting power supplied to the drive motor 18 causes the drive motor 18 and the gear assembly 20 to rotate the rod 26 and the septum 28 in a counterclockwise direction to unscrew and remove the cap 30 from the cryogenic tube 32. Conversely, when the septum 28 of the handheld device 10 is placed over the cap 30 of the cryogenic tube 32, the DPDT control switch 22 is in the "close" position, and the momentary SPST plunger control switch 24 is depressed, the resulting electrical power supplied to the drive motor 18 from the battery 13 and the electrical leads 15, 17, 23*a* and 23*b* causes the drive motor 18 and the gear assembly 20 to rotate the rod 26 and the septum 28 in a clockwise direction to screw on and fasten the cap 30 to the cryogenic tube 32.

In some embodiments, the gear assembly 20 comprises two gears, including a first toothed gear (not shown) fixedly attached to a spindle extending from the drive motor 18, and a second toothed gear fixedly attached to the proximal end of the rod 26, opposite from the end where the septum 28 is attached. The teeth of the first toothed gear are intermeshed with the teeth of the second toothed gear so that rotation of the spindle by the drive motor 18 rotates the first toothed gear, which in turn rotates the second toothed gear in the gear assembly 20, which rotates the rod 26, which in turn rotates the septum 28.

Figure 3:
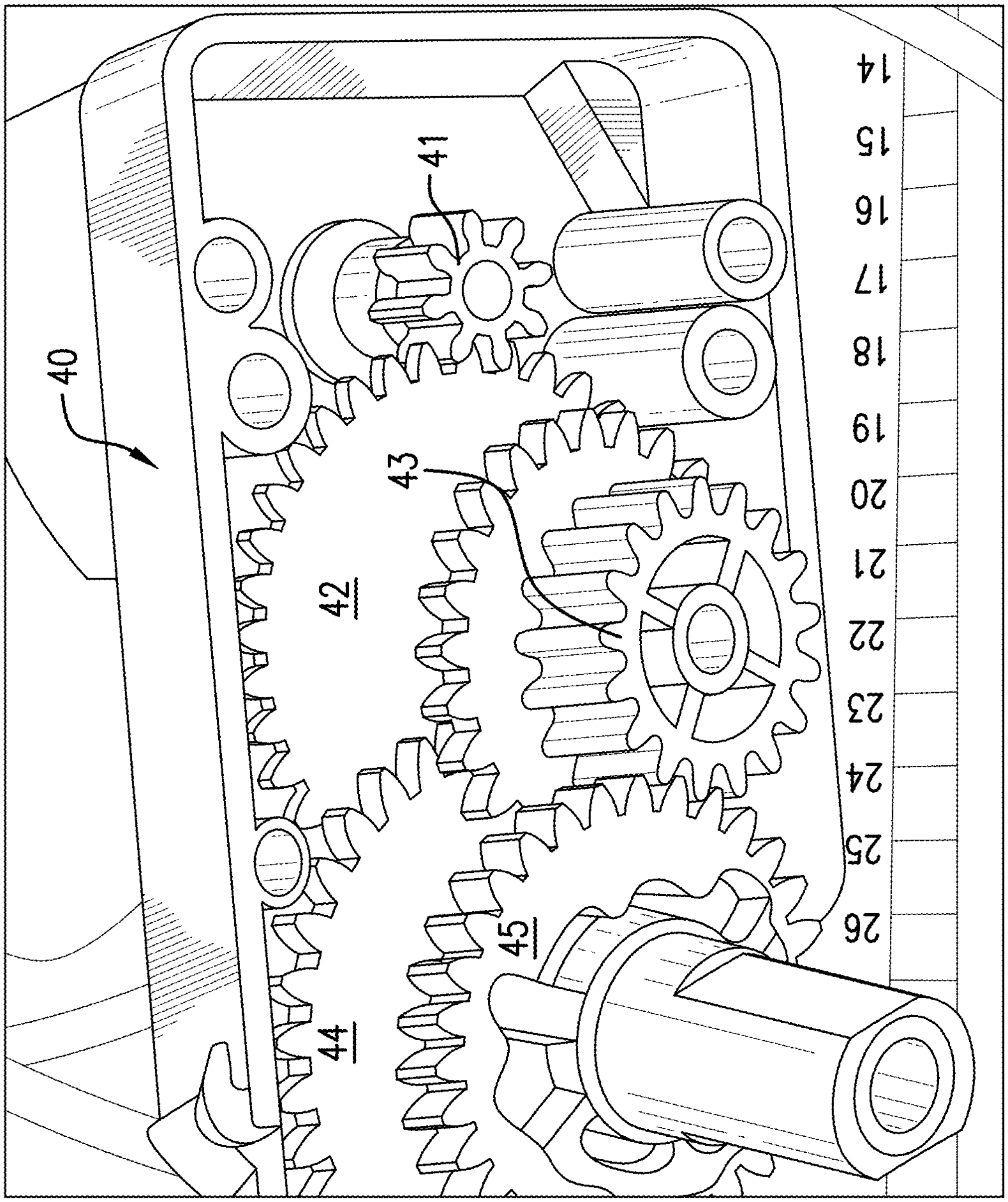
FIG. 3 shows an example of an arrangement of gears in a gear assembly of a handheld device configured to operate in accordance with one embodiment of the present invention.

However, in other embodiments, the multi-geared gear assembly may comprise three or more gears, or three or more sets of gears, which are arranged to rotate the rod 26 and the septum 28 when the drive motor 18 turns the spindle. FIG. 3 shows one example of such a multi-geared gear assembly 40. As shown in FIG. 3, the multi-geared gear assembly 40 comprises five different gears 41-45, including a single-wheel drive motor gear 41, a single-wheel output drive gear 45, and three secondary gears 42, 43 and 44 interposed between and the drive motor gear 41 and the output drive gear 45. In this example, the secondary gears 42, 43 and 44 each comprises a stacked pair of gear wheels. The teeth of gears 41-45 are intermeshed with each other so that rotation of the spindle by the drive motor 18 causes gear 41 of gear assembly 40 to rotate, which causes all of the other gears 42-45 to rotate in sync with the rotation of gear 41. Thus, the operation of the drive motor 18 to turn the spindle ultimately causes the rod 26 and the septum 28 to rotate.

Figure 4:
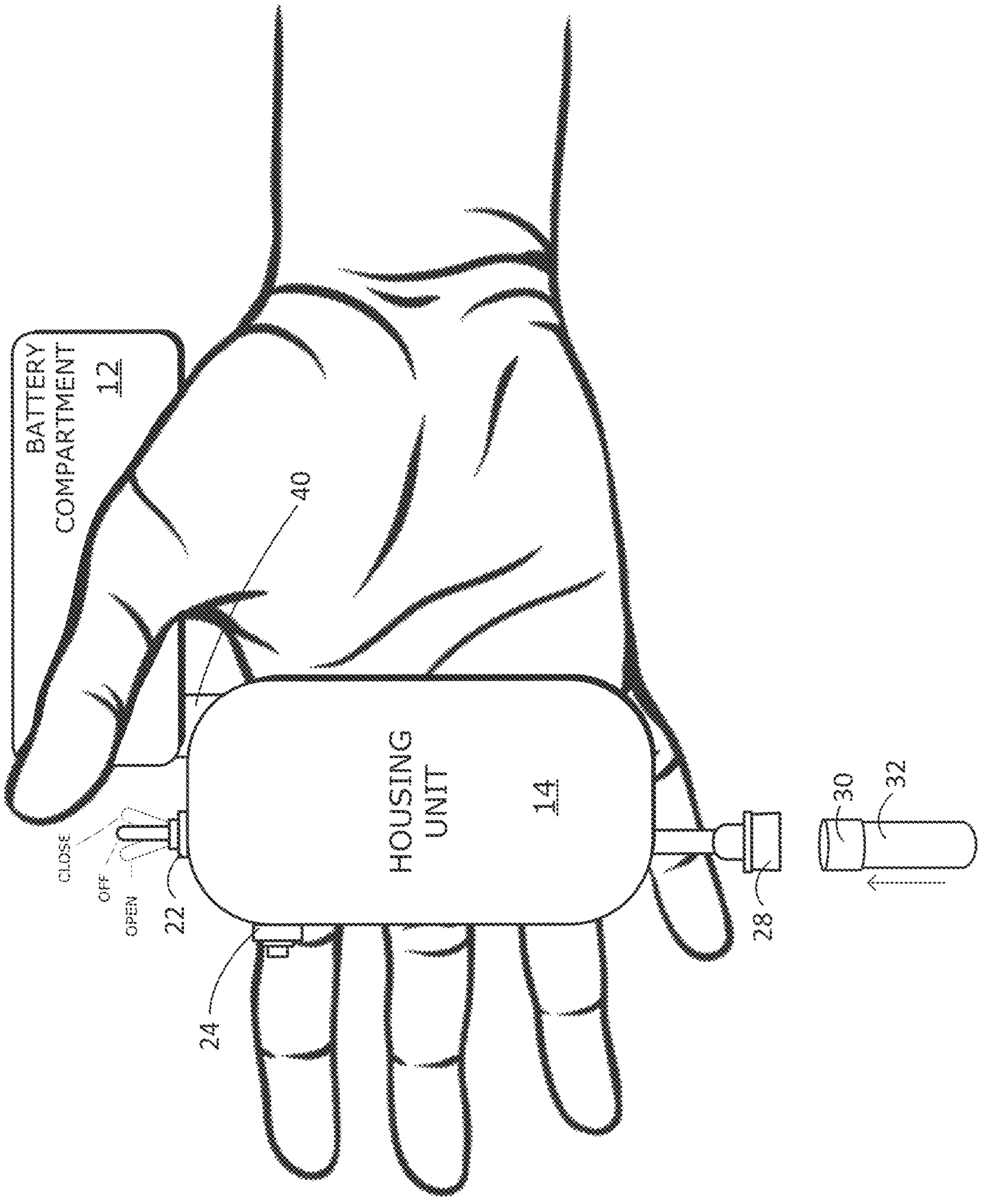
FIG. 4 shows, by way of example, a schematic diagram illustrating how the handheld device fits comfortably and ergonomically in the operator’s hand while it is being used.

The handheld device 10 is constructed with a focus on ergonomics. FIG. 4 shows, by way of example, how the handheld device 10 is configured to fit comfortably in a person's hand while it is being used. In particular, as shown in FIG. 3, the housing unit 14 is designed and shaped to fit easily into an individual's hands. Notably, in the exemplary embodiment shown in FIG. 3, the geometry of the housing unit 18, as well as the locations of the DPDT control switch 22 and the SPST momentary plunger control switch 24, ensure that the handheld device 10 can be operated equally well by either a right-handed or a left-handed person. In addition, in preferred embodiments, the battery compartment 12 is attached to the housing unit 14 with a connector 40 configured to permit the battery compartment 12 to rest across the top of the operator's hand and in the contour between the thumb and forefinger while the handheld device 10 is being used. This ergonomic arrangement stabilizes the handheld device 10 during use, and thereby permits the handheld device 10 to be used very effectively without the operator having to be grip the housing unit 14 with great force while using the handheld device to open or close the caps on a large number of cryogenic tubes or vials. The connector 40 may, in some embodiments, include an internal conduit for the electrical leads 15 that connect the battery 13 to the control switches 22 and 24 of the housing unit 14.

It should be noted, however, that a variety of alternative configurations for handheld device 10 are possible, depending on the situation, without departing from the scope of the present invention. For example, in some embodiments, it may be necessary or desirable to change or rearrange the location of the DPDT control switch 22 so that the battery compartment 12 may be fixedly connected to the top of the housing unit 14 without a pivoting mechanism. In such embodiments, the primary axes of the housing unit 14 and the battery compartment 12 may be parallel with each other in some cases, and perpendicular to each other in other cases. In such embodiments, it may also be necessary or desirable to place the DPDT control switch 22 on top of the battery compartment 12, instead of on the top of the housing unit 14.

Although the exemplary embodiments, uses and advantages of the invention have been disclosed above with a certain degree of particularity, it will be apparent to those skilled in the art upon consideration of this specification and practice of the invention as disclosed herein that alterations and modifications can be made without departing from the spirit or the scope of the invention, which are intended to be limited only by the following claims and equivalents thereof.

What is claimed is:

1. A handheld device for removing or replacing a screw-on cap on a cryogenic tube or cryogenic vial, the handheld device comprising:

a drive motor;

a control switch electrically connected to the drive motor, wherein the control switch comprises a directional control switch;

a rod having a proximal end and a distal end;

a gear assembly mechanically linking the proximal end of the rod to the drive motor;

a housing unit configured to be grasped by a human hand during operation of the handheld device, the housing unit being configured to house the drive motor, the gear assembly, the proximal end of the rod and the control switch, the housing unit further having a hole through which the distal end of the rod extends;

a rubber or rubber-like septum attached to the distal end of the rod that is extended through the hole in the housing unit, the septum being configured and shaped to form a friction-grip seal on the screw-cap of the cryogenic tube or cryogenic vial when the septum is pushed onto the screw-cap or the screw-cap is pushed into the septum; and a battery compartment, connected to the housing unit with a solid connector, the battery compartment comprising an inner cavity adapted to hold a battery and a pair of electrical contacts, the pair of electrical contacts being configured to make contact with the battery and to establish an electrical connection between the battery, the control switch and the drive motor, wherein the connector permits the battery compartment to rest across the top of the human hand and in the contour between a thumb and a forefinger of the hand;

wherein (1) activation of the control switch energizes the electrical connection between the battery, the directional control switch and the drive motor, and (2) energizing the electrical connection causes the drive motor and the gear assembly to start rotating the rod and the septum, and the rotation of the rod and the septum tightens or loosens the screw-cap on the cryotube or cryovial, and wherein the gear assembly comprises three or more toothed gears, which comprise a first toothed gear and a second toothed gear, wherein the first toothed gear and the second toothed gear have different sizes.

2. The handheld device of claim 1, wherein the directional control switch is a double-position, double-throw (DPDT) control switch capable of being set in one of three positions, the three positions including:

(a) an "open" position to select continuous rotation of the rod and septum in one direction to unscrew and remove a cap from the cryogenic tube or vial, (b) a "close" position to select continuous rotation of the rod and septum in an opposite direction to screw the screw-cap onto the cryotube or cryovial, and (c) an "off" position to disconnect the electrical connection between the battery and the drive motor.

3. The handheld device of claim 1, wherein the control switch further comprises a power control switch, which is a momentary single-position, single-throw (SPST) plunger control switch that will energize the electrical connection between the battery, the control switch and the drive motor to rotate the rod and the septum while the power control switch is depressed, and will prevent the electrical connection from being energized while the power control switch is not depressed.

4. The handheld device of claim 1, further comprising two control switches, the two control switches comprising (1) a directional control switch operable to determine a direction of rotation for the rod and the septum, and (2) a power control switch operable to energize the electrical connection between the battery, the control switch and the drive motor while the power control switch is depressed, and to prevent the electrical connection from being energized while the power control switch is not depressed.

5. The handheld device of claim 1, wherein the control switch further comprises a power control switch, which is a locking SPST plunger control switch.

* * * * *